(12) United States Patent
Chen et al.

(10) Patent No.: US 11,956,534 B2
(45) Date of Patent: Apr. 9, 2024

(54) IMAGE CONVERSION DEVICE FOR DIGITAL IMAGE SIGNALS

(71) Applicant: QuantumZ Inc., Kaohsiung (TW)

(72) Inventors: Chun-Chieh Chen, Kaohsiung (TW);
Ming-Che Hsieh, Kaohsiung (TW);
Po-Ting Chen, Kaohsiung (TW)

(73) Assignee: QuantumZ Inc., Kaohsiung (TW)

( * ) Notice: Subject to any disclaimer, the term of this patent is extended or adjusted under 35 U.S.C. 154(b) by 250 days.

(21) Appl. No.: 17/506,681

(22) Filed: Oct. 21, 2021

(65) Prior Publication Data

US 2023/0130130 A1 Apr. 27, 2023

(51) Int. Cl.
*H04N 23/60* (2023.01)
*H04N 23/52* (2023.01)
*H04N 23/55* (2023.01)

(52) U.S. Cl.
CPC ........ *H04N 23/665* (2023.01); *H04N 23/52* (2023.01); *H04N 23/55* (2023.01)

(58) Field of Classification Search
CPC ...... H04N 23/665; H04N 23/52; H04N 23/55; G02B 6/00; H01S 3/302; H01S 3/1608
See application file for complete search history.

(56) References Cited

U.S. PATENT DOCUMENTS

| | | | |
|---|---|---|---|
| 2014/0300694 A1 | 10/2014 | Smalley et al. | |
| 2014/0300695 A1 | 10/2014 | Smalley et al. | |
| 2017/0155225 A1* | 6/2017 | Villeneuve | ............ G01S 7/4817 |
| 2020/0192089 A1 | 6/2020 | Haddick et al. | |

* cited by examiner

*Primary Examiner* — Nicholas G Giles
(74) *Attorney, Agent, or Firm* — Leong C. Lei

(57) ABSTRACT

An image conversion device includes: a lens module configured to allow passing of image light beams of an object, an optical waveguide element configured to transmit the image light beams to a light processing component, and an image sensor configured to convert the image light beams into digital image signals. By changing image capturing and image forming methods, higher image quality may be achieved and expanding flexibility may be maintained.

17 Claims, 7 Drawing Sheets

IMAGE CONVERSION DEVICE FOR DIGITAL IMAGE SIGNALS

BACKGROUND

Technical Field

The present invention relates to an image conversion device, and in particular, aims to improve image-capturing and imaging manners of an image pickup system, to implement a system configuration that satisfies higher image quality requirements and that keeps flexibility with future expandability.

Related Art

Existing digital image pickup systems are applied to, for example, digital image captures, smart phones, tablet computers, notebook computers, personal computers including a webcam, aerial image systems, driving loggers, WiFi image systems, and doorbell image systems, in which images are captured and formed through the digital image pickup systems, and when necessary, the images are displayed instantly through screens at the same time.

FIG. 1 shows a schematic block diagram of a conventional image conversion device. The imaging principle of the digital image pickup system is as follows: object-side light enters a lens module 11, then passes through a filter 12, and reaches an image sensor 13. In the existing structural design, the lens module 11, the filter 12, and the image sensor 13 are disposed on the same axis, so that the object-side light enters the image sensor 13 in a straight line. Photons incident on the image sensor 13 generate movable electric charges. This is referred to as an internal photoelectric effect. The movable electric charges converge to form electric signals, which are then converted into digital image signals through internal conversion. The digital image signals are transmitted through a circuit board 14 to an application processor 15 for processing. The application processor 15 may store or output digital image data after processing the digital image signals, and in implementation, the application processor 15 may also simultaneously perform subsequent processing of time and sound effects The image sensor 13 mainly includes two types: a charge coupled device (CCD) and a complementary metal-oxide semiconductor (CMOS) device. With the development of semiconductor technologies, the quantity of pixels in the image sensor 13 is increased, and images with better image quality are outputted. Accordingly, the quantity of digital image data outputted by the image sensor 13 is also greatly increased. In a case that the image conversion device depends on digital signal transmission by the existing circuit board 14, the digital image data transmitted by the image sensor 13 cannot be completely and rapidly transmitted to the application processor 15 for processing. As a result, when the image data is too large in quantity, a delay is caused during transmission thereof. Therefore, the image display on the screen cannot keep up with image capturing actions of the lens module 11, and consequently, the image data cannot be instantly transmitted to the screen or rapidly stored.

In a product definition stage, pixel and size requirements of the image conversion device and whether a strobe light is required have to be determined, and are less likely to be changed subsequently once being determined. Therefore, whether a model of an image sensor 14 matches the application processor 15 is determined, and the model of the image sensor 14 in the digital image pickup system cannot be replaced flexibly as required.

To handle the transmission of a large quantity of data, a denser circuit design is usually adopted for the existing circuit board 14, in which electromagnetic wave interference easily occurs between electronic elements, and especially when a large current needs to be transmitted by using a flash device, signal transmission is also interfered with, resulting in signal noise and a delay.

SUMMARY

An objective of the present invention is to provide an image conversion device, in which image-capturing and imaging manners are changed. Image data can be rapidly transmitted to a screen or rapidly stored, to satisfy higher image quality requirements and keep flexibility with expandability.

Another objective of the present invention is to provide an image conversion device without the problem in an existing circuit board that a multilayer board design is needed to increase the data transmission capacity, thereby resolving a thermal effect generated by long-time transmission of a large amount of data, and prolonging an overall life time of a product.

Still another objective of the present invention is to provide an image conversion device without the problem that circuits of an existing circuit board are excessively dense, thereby improving the signal stability when the system needs to use a large current.

To resolve the problems, the present invention discloses an image conversion device, applied to an electronic product including a digital image pickup system, the image conversion device comprising: a lens module, configured to allow passing of image light beams of an object; an optical waveguide element as a medium to transmit the image light beams, and configured to conduct analog signals of the image light beams; a light processing component, configured for a penetration process of the image light beams transmitted from the optical waveguide element; and an image sensor configured to convert the image light beams passing through the light processing component into digital image signals and to optimize the digital image signals.

The present invention discloses an image conversion device, applied to an electronic product including a digital image pickup system, the image conversion device comprising: a lens module, configured to allow passing of image light beams of an object; an optical waveguide element as a medium to transmit the image light beams, where a front end of the optical waveguide element includes a multiplexer configured to divide the image light beams into spectra of light waves, merge the spectra of light waves, and transmit the spectra of light waves to the optical waveguide element for an analog signals transmission; the other end of the optical waveguide element includes a demultiplexer configured to separate and restore the spectra of light waves from the optical waveguide element; a light processing component, configured for a penetration process of the spectra of light waves transmitted from the optical waveguide element; and an image sensor configured to convert the image light beams passing through the light processing component into digital image signals and to optimize the digital image signals.

The advantages of the present invention lie in that, by using the guiding characteristics of analog optical signals of the optical waveguide element, the image light beams are transmitted to the image sensor. In application, the image sensor may be directly connected to an application processor through an interface of a semiconductor, and the digital signals are directly outputted and received between the image sensor and the application processor.

The image conversion device in the present invention does not need to use a circuit board to transmit the signals and data as in a conventional digital image pickup system, but changes image-capturing and guiding analog image light beams manners. Accordingly, the image conversion device can satisfy higher image quality requirements and keep flexibility with expandability. In implementation, the image conversion device may not have the problem in the circuit board that a multilayer board design is needed to increase the data transmission capacity, thereby resolving a thermal effect generated by long-time transmission of a large amount of data, and prolonging an overall life time of a product. The image conversion device does not have the electromagnetic wave interference problem in a case that the existing circuit board is designed to be excessively dense, thereby improving signal stability especially when the system has a large current (when the strobe light is used).

DETAILED DESCRIPTION

To make a person skilled in the art better understand the solutions of the present invention, the technical solutions in the embodiments of the present invention will be clearly and thoroughly described below with reference to the accompanying drawings in the embodiments of the present invention. Apparently, the described embodiments are merely some rather than all of the embodiments of the present invention. Based on the embodiments of the present invention, all other embodiments obtained by making equivalent changes or modifications by a person of ordinary skill in the art shall fall within the scope of the present invention.

Figure 1:
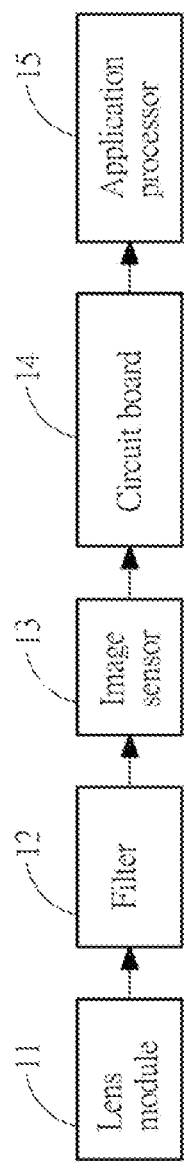
FIG. 1 is an application schematic diagram of a conventional image conversion device in the related art.
Figure 2:
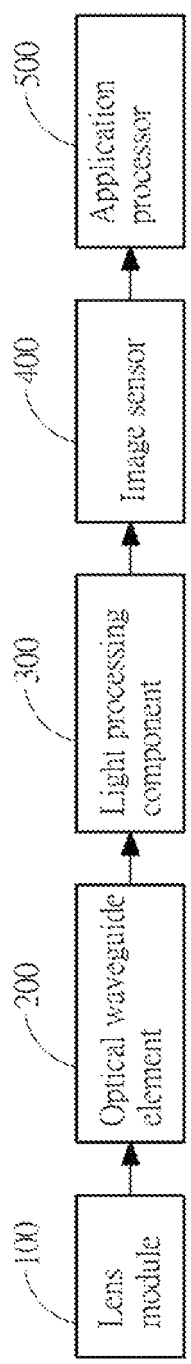
FIG. 2 is a first application schematic diagram of an image conversion device of the present invention.

FIG. 2 is a first application schematic diagram of an image conversion device of the present invention. The present invention provides an image conversion device, applied to an electronic product including a digital image pickup system, the image conversion device comprising: a lens module 100 configured to allow passing of image light beams of an object; an optical waveguide element 200 as a medium transmit the image light beams, and configured to conduct analog signals of the image light beams; a light processing component 300 configured for a penetration process of the image light beams transmitted from the optical waveguide element; and an image sensor 400 configured to convert the image light beams passing through the light processing component into digital image signals and to optimize the digital image signals.

In an actual application, a digital image pickup system will include an application processor 500. The application processor 500, after receipt of digital image signals transmitted from the image sensor 400, may perform an image signal processing of the digital image signals and thereafter store or output digital image data after processing the digital image signals.

Figure 3:
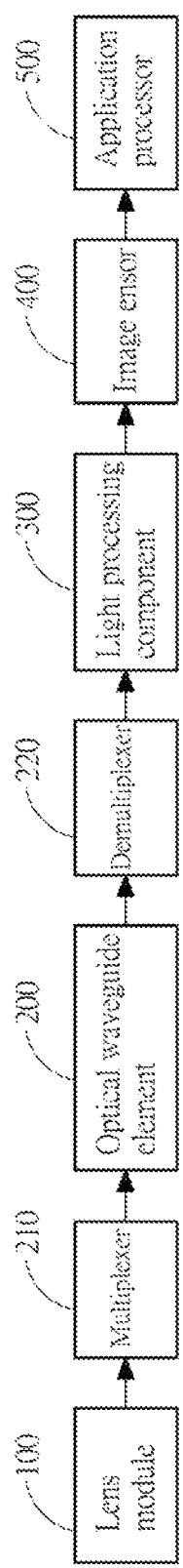
FIG. 3 is a second application schematic diagram of an image conversion device of the present invention.

FIG. 3 is a second application schematic diagram of an image conversion device of the present invention. The difference from FIG. 2 is that, after the lens module 100 is configured to allow passing of image light beams of an object, a front end of the optical waveguide element 200 includes a multiplexer 210 configured to divide the image light beams into spectra of light waves, merge the spectra of light waves, and transmit the spectra of light waves to the optical waveguide element for an analog image transmission; and the other end of the optical waveguide element includes a demultiplexer 220 configured to separate and restore the spectra of light waves from the optical waveguide element 200, perform optical penetration processing on the restored spectra of light waves of the image by using the light processing component 300, and then convert the spectra of light waves into digital image signals by using the image sensor 400 and to perform optimization on the digital image signals. Finally, the application processor 500 performs image signal processing, and stores or outputs the digital image data after processing the digital image signals.

Figure 4:
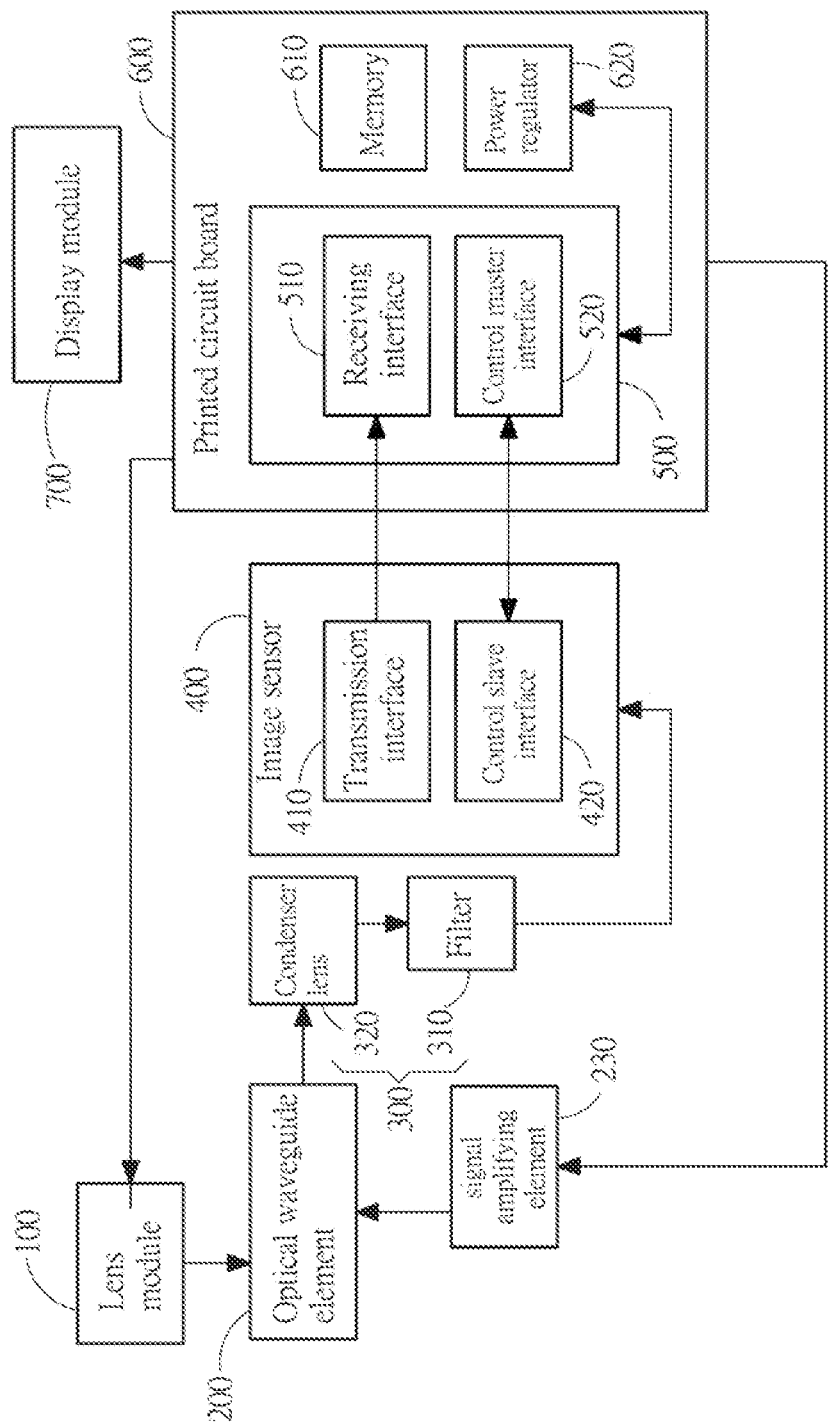
FIG. 4 is a first schematic diagram of a first embodiment of the present invention.

FIG. 4 is a schematic diagram of a first embodiment of the present invention. The lens module 100 is configured to allow passing of image light beams of an object. The optical waveguide element 200 serves as a transmission medium of the image light beams and configured to conduct an analog image of the image light beams. In an actual application, the optical waveguide element 200 may be one of a slab waveguide, a stripe waveguide, and a fiber waveguide according to a geometric shape, and in a product processing process, an appearance of a straight, curved, or grating channel is manufactured. It is known that the optical waveguide element 200 is made of materials such as polymer, epoxy, glass, acryl, and silicon.

The light processing component 300 is configured for a penetration process of the image light beams and the processed image light beams are transmitted to the image sensor 400. In an actual application, the light processing component 300 may be a filter 310. The filter is configured to separate and filter the image light beams, and is usually an JR filter. In an actual application, the light processing component 300 may be a condenser lens 320 and a filter 310. The condenser lens 320 performs condensing and clarifying on the image light beams transmitted from the optical waveguide element 200, and then the filter 310 separates and filters the light.

The separated image light beams reach the image sensor 400, through a photoelectric effect in the image sensor 400, movable electric charges converge to form the electric signals, and the electric signals are further converted into the digital image signals through internal conversion and an optimization of the digital image signals are performed. In practice, the image sensor 400 is either a charge coupled device (CCD) or a complementary metal-oxide semiconductor (CMOS) device.

After receiving the digital image signals transmitted from the image sensor 400, the application processor 500 may perform image processing on the digital image signals, and store or output the digital image data after processing the digital image signals. In an actual application, the application processor 500 is disposed on a printed circuit board (PCB) 600. The printed circuit board 600 may be a control board of an electronic product such as a digital image capture, a smart phone, a tablet computer, a notebook computer, or a personal computer. In an actual application, the printed circuit board 600 includes a memory 610, configured to store the data. In practice, the memory 610 may alternatively be a solid-state disk (SSD). In practice, the printed circuit board 600 also includes a power regulator 620, configured to control and regulate a current outputted from a battery (not shown in the figure), and control the power required by the elements of the overall system. For example, the printed circuit board 600 may control the lens module 100 through power to adjust a focal length, thus making image light beams passing the lens module 10 more clear.

In an actual application, the digital image data processed by the application processor 500 is transmitted to a display module 700 by using the printed circuit board 600, and the images are displayed by using the display module 700. The image conversion device further includes a signal amplifying element 230. Through the control of the printed circuit board 600, the signal amplifying element 230 is configured to relay and reamplify the optical signals of the optical waveguide element 200, so that the transmission of the optical signals in the optical waveguide element 200 is performed normally. In practice, the signal amplifying element 230 may be either an erbium-doped fiber amplifier (EDFA) or a raman amplifier.

In an actual application, a connection interface between the image sensor 400 and the application processor 500 needs to conform to a communication protocol, for example, the Mobile Industry Processor Interface (MIPI) communication protocol, so that an interface of an electrical connection between the image sensor 400 and the application processor 500 is standardized, to transmit the digital image signals and control signals.

In an actual application, under a framework of the MIPI communication protocol, the image sensor 400 includes a transmission interface 410 and a control slave interface 420 as an image data transmission interface and a control interface. The transmission interface 410 may be a D-PHY interface or a C-PHY interface. The control slave interface 420 may be a CCI slave interface of a CCI.

Similarly, under the framework of the MIPI communication protocol, the application processor 500 includes a receiving interface 510 and a control master interface 520 as an image data transmission interface and a control interface. The receiving interface 510 may be a D-PHY interface or a C-PHY interface, and the control master interface 520 may be a CCI master interface of a CCI.

Figure 5:
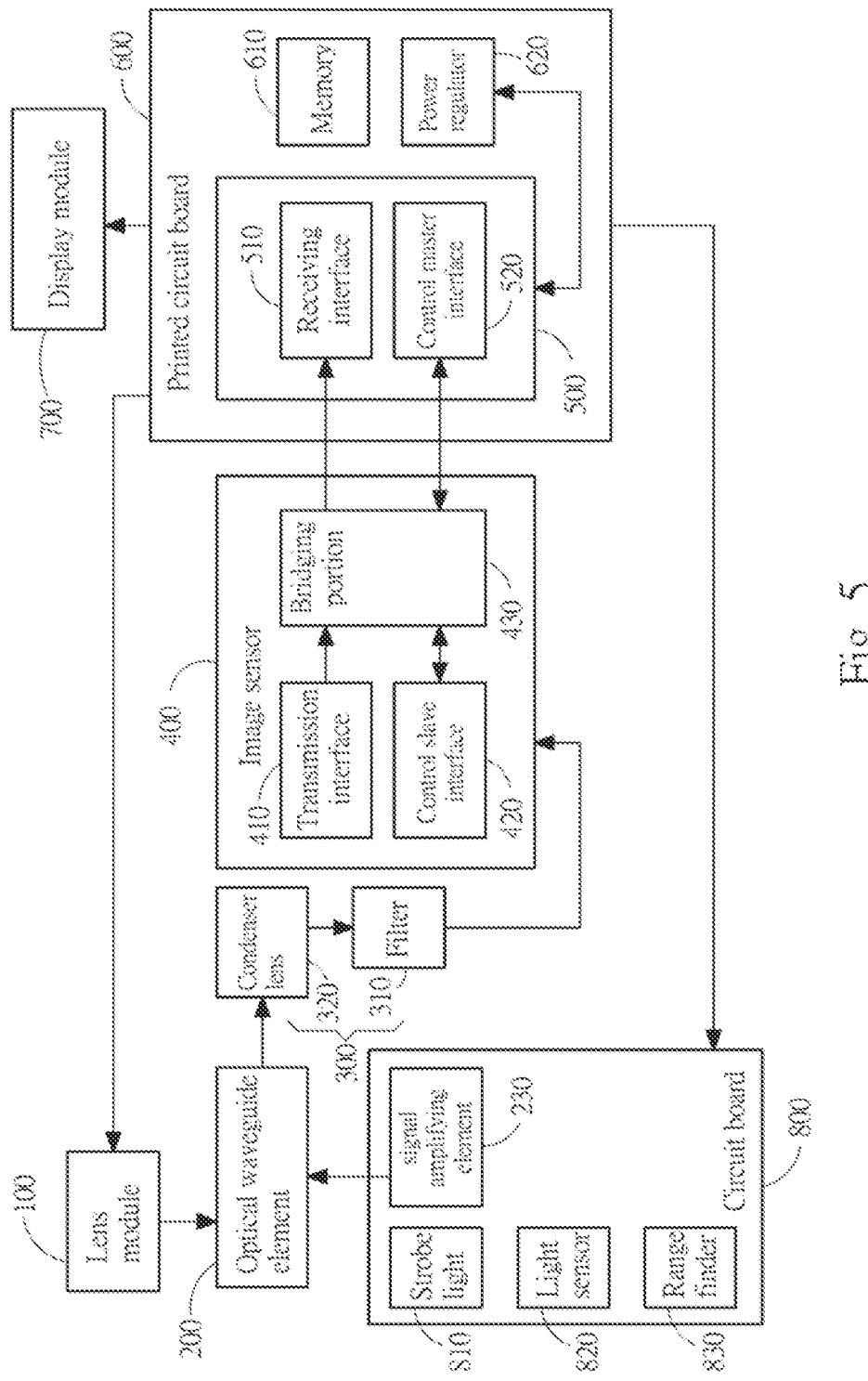
FIG. 5 is a second schematic diagram of the first embodiment of the present invention.

Referring to FIG. 5 again, in an actual application, the image sensor 400 and the application processor 500 may be connected to each other through a bridging portion 430. In the figure, the bridging portion 430 is disposed on the image sensor 400. In practice, the bridging portion 430 may alternatively be disposed on the application processor 500 or the printed circuit board 600. The connection interface (the transmission interface 410, the control slave interface 420, the receiving interface 510, and the control master interface 520) between the image sensor 400 and the application processor 500 may be adjusted by using the bridging portion 430, so that the connection between the image sensor 400 and the application processor 500 with more models may be performed by using the bridging portion 430. The bridge portion may be applied to and implemented in the image sensors 400 manufactured by different manufacturers and the application processors 500 manufactured by different manufacturers.

Generally, in an application, the digital image pickup system needs to measure light and fill light during image capturing. According to the present invention, in practice, the signal amplifying element 230 may be integrated with a strobe light 810, a light sensor 820, and a range finder 830 on a circuit board 800. In an actual application, the circuit board 800 may be one selected from a group consisting of a printed circuit board (PCB), a flexible printed circuit board (FPCB), and a rigid-flex board.

The printed circuit board 600 controls the device. When the digital image pickup system works, the strobe light is configured to flash and fill light, the light sensor 820 is configured to sense whether the light is sufficient and whether to fill light, and the range finder 830 is configured to sense a distance and motion of the object, to check whether the lens module 100 needs to be adjusted.

Because a large current is likely to be generated during flashing, and in the present invention, the conventional circuit board 14 is not required for transmitting digital signals, the problem of electromagnetic wave interference in a case of a dense circuit design is resolved, and particularly, when a large current, for example, a large current for flashing, needs to be used, signal stability can be improved.

Figure 6:
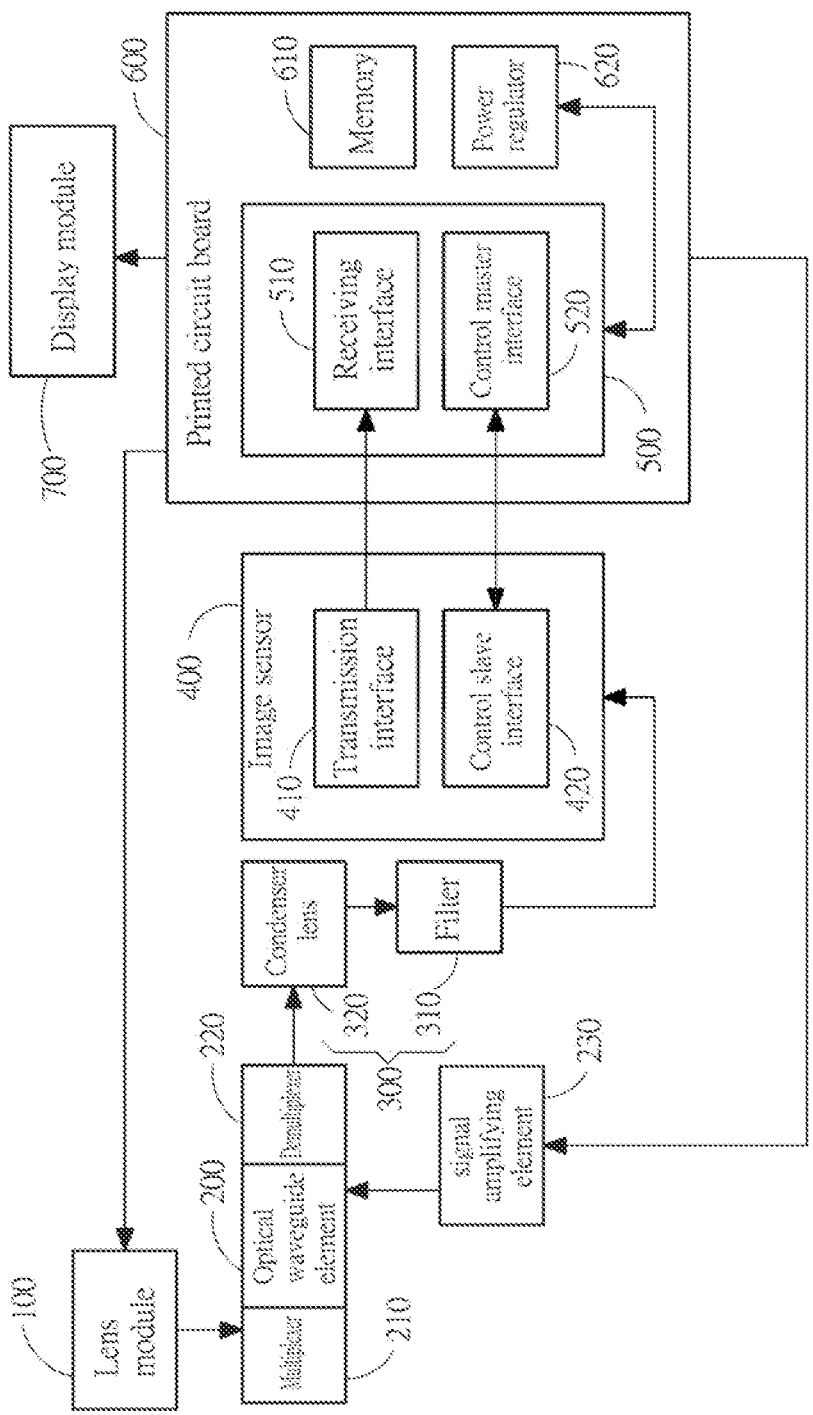
FIG. 6 is a first schematic diagram of a second embodiment of the present invention.
Figure 7:
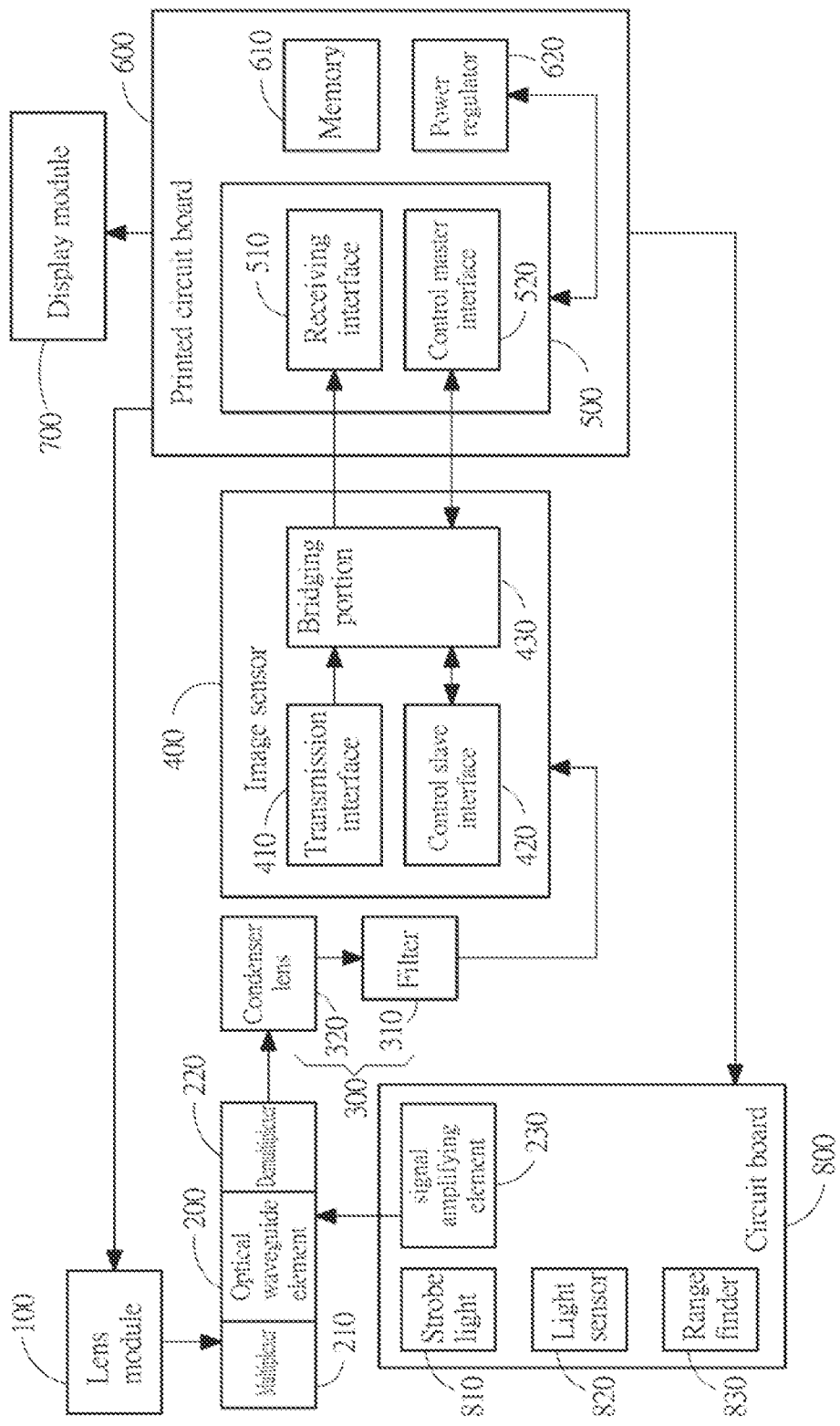
FIG. 7 is a second schematic diagram of the second embodiment of the present invention.

FIG. 6 and FIG. 7 are schematic diagrams of a second embodiment of the present invention. The difference from the first embodiment (shown in FIG. 4 and FIG. 5) is that, after the lens module 100 is configured to allow passing of image light beams of a subject, a front end of the optical waveguide element 200 includes a multiplexer 210, configured to: divide the image light beams into spectra of light waves, merge the spectra of light waves, and transmit the spectra of light waves to the optical waveguide element 200 for analog image transmission, and the other end of the optical waveguide element 200 includes a demultiplexer 220 configured to separate and restore the spectra of light waves transmitted from the optical waveguide element, perform optical penetration processing on the restored spectra of light waves of the image by using the light processing component 300, and then convert the restored spectra of light waves into digital image signals by using the image sensor 400. The application processor 500 performs image processing, and stores or outputs the digital image data after processing the digital image signals.

In practice, the multiplexer 210 and demultiplexer 220 are respectively selected from a fused biconical taper (FBT), a thin film filter (TFF), an arrayed waveguide grating (AWG), and an optical interleaver. The multiplexer 210, the optical waveguide element 200, and the demultiplexer constitute a wavelength division multiplexing (WDM) technology, that is a plurality of light waves of different wavelengths are synchronously transmitted in a single fiber, so that the data transmission speed and capacity are multiplied.

The advantages of the present invention lie in that, by using the guiding characteristics of the optical signals of the optical waveguide element, the object-side light is transmitted to the image sensor. The image sensor and the application processor are directly connected through an interface of a semiconductor, and the digital signals are directly outputted and received between the image sensor and the application processor. The image conversion device according to the present invention changes image-capturing and imaging manners of a image capture device. The image data can be rapidly transmitted to a screen or rapidly stored, to satisfy higher image quality requirements and keep flexibility with expandability. The image conversion device does not have the problem of electromagnetic wave interference in a case that circuits are designed to excessively dense, thereby improving the signal stability, resolving a thermal effect generated by long-time transmission of a large amount of data, and prolonging an overall life time of a product.

The above descriptions are merely preferred embodiments of the present invention, and are not intended to limit the scope of the embodiments of the present invention, any simple equivalent replacement and modification according to the scope of the patent application of the present invention and descriptions of the invention shall fall within the protection scope of the present invention.

What is claimed is:

1. An image conversion device, comprising:
   a lens module, configured to allow passing of image light beams of an object;
   an optical waveguide element, as a medium to transmit said image light beams, and configured to conduct analog signals of said image light beams;
   a light processing component, configured for a penetration process of said image light beams transmitted from said optical waveguide element, wherein said light processing component comprises a condenser lens and a filter;
   an image sensor, configured to convert said image light beams passing through said light processing component into digital image signals and to optimize said digital image signals; and
   a signal amplifying element disposed on a circuit board and configured to relay and reamplify optical signals of said optical waveguide element;
   wherein said signal amplifying element is integrated with a strobe light, a light sensor and a range finder in said circuit board.

2. The image conversion device of claim 1, wherein said optical waveguide element is one of a slab waveguide, a stripe waveguide, or a fiber waveguide; and an appearance of a channel is one of a straight, curved, or grating.

3. The image conversion device of claim 1, wherein said light processing component is a filter configured to separate and filter the light.

4. The image conversion device of claim 1, wherein said light processing component comprises a condenser lens and a filter; said condenser lens performs condensing and clarifying on said image light beams transmitted from said optical waveguide element, and then said filter separates and filters said image light beams.

5. The image conversion device of claim 1, wherein said signal amplifying element is either an erbium-doped fiber amplifier (EDFA) or a raman amplifier.

6. The image conversion device of claim 1, wherein said image sensor is either a charge coupled device (CCD) or a complementary metal-oxide semiconductor (CMOS) device.

7. The image conversion device of claim 1, wherein said image sensor includes a bridging portion connected to an interface of an application processor that stores or outputs digital image data after receiving said digital image signals.

8. An image conversion device, comprising:
   a lens module, configured to allow passing of image light beams of an object;
   an optical waveguide element, as a medium to transmit said image light beams, wherein a front end of said optical waveguide element includes a multiplexer configured to divide said image light beams into spectra of light waves, merge said spectra of light waves, and transmit said spectra of light waves to said optical waveguide element for an analog signals transmission; the other end of said optical waveguide element includes a demultiplexer configured to separate and restore said spectra of light waves from said optical waveguide element;
   a light processing component, configured for a penetration process of said spectra of light waves transmitted from said optical waveguide element, wherein said light processing component comprises a condenser lens and a filter;
   an image sensor, configured to convert said image light beams passing through said light processing component into digital image signals and to optimize said digital image signals.

9. The image conversion device of claim 8, wherein said optical waveguide element is one of a slab waveguide, a stripe waveguide, or a fiber waveguide; and an appearance of a channel is one of a straight, curved, or grating.

10. The image conversion device of claim 8, wherein said multiplexer and demultiplexer are respectively selected from a fused biconical taper (FBT), a thin film filter (TFF), an arrayed waveguide grating (AWG), and an optical interleaver.

11. The image conversion device of claim 8, wherein said light processing component is a filter configured to separate and filter the light.

12. The image conversion device of claim 8, wherein said light processing component includes a condenser lens and a filter, said condenser lens performs condensing and clarifying on said image light beams of said spectra of light waves from said optical waveguide element; said filter separates and filters said image light beams of said spectra of light waves.

13. The image conversion device of claim 8, further comprising a signal amplifying element disposed on a circuit board and configured to relay and reamplify optical signals of said optical waveguide element.

14. The image conversion device of claim 13, wherein said signal amplifying element is an erbium-doped fiber amplifier (EDFA) or a raman amplifier.

15. The image conversion device of claim 13, wherein said signal amplifying element is integrated with a strobe light, a light sensor and a range finder in said circuit board.

16. The image conversion device of claim 8, wherein said image sensor is a charge coupled device (CCD) or a complementary metal-oxide semiconductor (CMOS) device.

17. The image conversion device of claim 8, wherein said image sensor includes a bridging portion connected to an interface of an application processor configured to store or output digital image data after receiving s digital image signals.

* * * * *